Patented Jan. 21, 1947

2,414,563

UNITED STATES PATENT OFFICE 2,414,563

PROCESS FOR IMPROVING THE CLARITY OF CELLULOSE ETHERS

John Henry Sharphouse, Philip Richard Hawtin, John Downing, and Walter Henry Groombridge, Spondon, near Derby, England, assignors to British Celanese Limited, London W. 1, England, a company of Great Britain No Drawing. Application February 26, 1943, Serial No. 477,306. In Great Britain March 6, 1942

7 Claims. (Cl. 260—232)

This invention is concerned with improvements in the production of cellulose derivatives and particularly in the production of cellulose ethers.

Cellulose ethers, particularly ethyl cellulose, and especially those ethers which are soluble in organic solvents, have recently become of considerable industrial importance, for example for the production of lacquers and plastic compositions. It is however frequently found that the ethers do not yield compositions, particularly solutions, of sufficiently high clarity to be satisfactory for industrial purposes.

A number of methods have already been suggested for improving the properties of cellulose ethers, particularly in respect of the clarity of the solutions which they yield. For example, it has been proposed to treat them with chemical reagents in order to get rid of impurities, but such methods, even if satisfactory from this point of view, frequently lead to a considerable reduction in the viscosity of the ethers, which is very undesirable.

It has now been discovered that cellulose ethers which yield solutions of low clarity can be considerably improved in this respect by extraction with liquids which are solvents for only part of the ether treated. The liquid which is employed may be one which dissolves the fractions of higher clarity leaving the less valuable fractions undissolved, but it is preferred to employ a liquid which dissolves out the low clarity fractions and leaves the fractions of higher clarity undissolved.

In carrying out the invention the cellulose ether may be treated initially with a liquid which is only a partial solvent therefor, i. e. which is a solvent for only part of the cellulose ether present. Preferably such a liquid is a mixture of a solvent and a non-solvent for the ether. Alternatively, the partial solvent may be formed in the presence of the cellulose ether by dissolving the ether in a liquid which is a solvent for the ether as a whole and then precipitating a portion of the ether by mixing a non-solvent therefor with the solution. It has been found, however, that much better results can be obtained, taking into account not only the clarity of the ether produced but also the quantities of liquid required for clarification and the amount of work involved, by a combination of the above methods, according to which the ether is first dissolved in a liquid which is a solvent for the ether as a whole, the ether is then partially precipitated by mixing a non-solvent with the solution, preferably after having filtered the solution to remove any undissolved material, and the precipitated ether is then extracted with a partial solvent for the ether. Preferably the liquids employed are such that the lower clarity fractions are dissolved. The process of extraction may be repeated a number of times until no further substantial improvement in the clarity of the product occurs. Extraction of the ether is usually best effected by stirring it up thoroughly with the extraction liquid then separating the ether from the extract. This may be effected by filtration but the operation is usually difficult on account of the gelatinous nature of the ether and it has been found preferable as a rule to allow the ether to collect together and then to separate it from the clear liquid by decantation. The ether itself usually retains a considerable quantity of liquid, for example 2 or 3 times its volume, and the next stage of extraction can be effected by mixing fresh extraction liquid with the mixture of ether and liquid left after removal of the clear extraction liquid. When, however, as is usually the case, the extraction liquid consists of a mixture of a solvent and a non-solvent for the ether it is preferred to mix the solvent with the ether and residual extraction liquid, thus bringing some or all of the ether into solution, and then to mix in the required quantity of non-solvent to form an extraction liquid having the desired concentration, after which the ether is well stirred, allowed to collect together and then separated from the clear liquid. This method of operation has the advantage that the ether is maintained in a fine state of sub-division during the extraction process by repeated solution and precipitation.

The volume of extraction liquid used at each stage represents a compromise between economy of liquid and the use of sufficient to obtain satisfactory extraction. As the ether may retain as much as 2 or 3 times its volume of liquid, if e. g. only four times its volume of liquid is used at each stage only one half or one quarter of the dissolved ether is separated at each stage and adequate purification may involve a considerable number of treatments. On the other hand, the use of a very high liquid-solid ratio is clearly uneconomic. In practice proportions of liquid to ether of from about 6:1 or 7:1 up to about 10:1 usually represent a satisfactory compromise. With such proportions a very considerable improvement in clarity can be effected with three or four stages of treatment. For example, an ethyl cellulose which yields a 20% solution in an 80:20 mixture of toluene and ethyl alcohol having a light transmission only 10–15% of that of the pure solvent may be converted into one which under the same conditions transmits from 50 to 70 or even 80% of the light transmitted by the pure solvent.

The treatment may be carried out at ordinary atmospheric temperature or at a higher temperature, for example 30 or 40° C.

It may be applied either to a cellulose ether which has already been washed and dried or immediately after the etherification process. In the latter case it is not as a rule economic to dissolve the ether by direct addition of solvent to the reaction mixture, since this usually contains a large amount of sodium hydroxide. It is preferable to wash the ether first to remove the major portion of the other constituents of the reaction mixture and then to treat it as described above. Usually one wash with water is sufficient to render the ether sufficiently pure for treatment by the process of the present invention.

After the treatment has been completed the cellulose ether should be thoroughly washed.

The process of the present invention is particularly concerned with the treatment of ethyl cellulose having an ethoxy content of about 40 to 50%, especially 44 to 48%, which is soluble in a mixture of toluene and ethyl alcohol, to improve its clarity in such a mixture. For the clarification of such cellulose ethers it is preferred to employ lower fatty acids, e. g. propionic and butyric acids and especially acetic acid. The ether may be dissolved in anhydrous acid or a concentrated aqueous solution thereof, precipitated by the addition of water, either pure or in the form of dilute acid, to the solution and then extracted with an aqueous solution of the fatty acid, the concentration of which will depend upon the particular ether being treated, the fatty acid employed, and other factors. When extraction has been completed the ether should be thoroughly washed with water or, preferably, with a dilute solution of ammonia or other alkali, which has been found to be quicker and more efficient than water alone.

Acetic acid is the fatty acid which it is preferred to employ for the treatment of the above ethyl cellulose. The ether may, for example be dissolved in glacial acetic acid, the solution filtered if necessary, the ether partially precipitated by mixing with the solution sufficient water or dilute acid to reduce the concentration of the acid to between 45 and 65% and the precipitated ether then extracted a number of times, as indicated above, with an aqueous solution of acetic acid of a suitable concentration. The higher the concentration of the acetic acid the more efficient as a rule is the extraction and the higher is the clarity of the ethyl cellulose produced. On the other hand, the ethyl cellulose is usually more swollen and consequently the formation of two layers so that separation of the liquid from the ether can be effected is slower than with lower concentrations of acetic acid and the proportion of extraction liquid which it is possible to separate is also lower. The choice of concentration to be employed will therefore depend on the relative importance of this and other factors. Further, the ethers themselves differ in the nature and amount of the low clarity constituents which they contain and this also affects the choice of extraction liquid to be used.

As an indication it may be stated that about 50% aqueous acetic acid gives good results with ethyl cellulose soluble in mixtures of toluene and ethyl alcohol and having an average ethoxy content up to about 44%, 60% aqueous acetic acid is suitable when the average ethoxy content ranges from 44 to 48 or 50%, and with ethers of higher ethoxy content aqueous acetic acid up to 66% concentration or even more may be desirable.

The following is an example of the treatment of an ethyl cellulose having an ethoxy content of about 46% and soluble in an 80:20 mixture of toluene and ethyl alcohol, the parts given being by weight except where otherwise stated.

*Example*

100 parts of the ether were dissolved in 630 parts of glacial acetic acid at 35° C. and 400 parts of water then mixed in so as to precipitate the ethyl cellulose in a finely divided form. The mixture was then vigorously stirred for 5 hours, after which it was allowed to cool to 20° C. and left to stand overnight. As much as possible of the liquid was then siphoned off, after which glacial acetic acid was introduced, the mixture well stirred and then sufficient water stirred in to form 60% aqueous acetic acid. The quantity of acetic acid was such that with the water addition the mixture was brought to its original volume. The mixture was then stirred, allowed to stand and the liquid then separated as described above. The extraction operation was repeated until the amount of ethyl cellulose removed by the extraction liquid was very small. The ether was then washed free from acid and dried. Its viscosity was substantially the same but its colour was greatly reduced and the light transmission of a 20% solution of the ether in an 80-20 mixture of toluene and ethanol was over 70% of the light transmission of the pure solvent as compared with only about 13% in the case of a 20% solution of the untreated ether under the same conditions.

It will be noted that in the above example the ratio of washing medium to ether was about 10:1. It was found that if this ratio was reduced to any considerable extent, for example to as low as 4 or 5:1, the improvement in clarity was less even with a considerably greater number of extractions.

In order to reduce the total quantity of extraction medium required the extraction may be carried out by a countercurrent method, that is to say by using the extraction liquid separated in one stage of the extraction of one batch of ether for an earlier stage of the next batch. Usually fresh extraction medium is employed for the last stage of each batch and gradually works back a stage with each succeeding batch of ether.

Thus, in the treatment of a batch of ethyl cellulose of low clarity having an ethoxy content of about 48% the ether may be mixed with the 60% acetic acid separated in the second stage of treatment of a previous batch and then sufficient acetic acid and water incorporated separately to form a 60% solution of acetic acid in an amount equal to 6 to 7 times the volume of ether. The acid is mixed in first, so that the ether or at least part of it is dissolved, and then the water is added so that part of the ether is precipitated. The mixture is then thoroughly stirred or shaken for several hours, for example 4 or 5 hours, preferably at a temperature of about 30 to 40° C., allowed to cool and stand until the undissolved portion has collected together leaving a zone of clear liquid which can be decanted off. After this separation operation the ether is again stirred or shaken up with the aqueous acid separated in the third stage of treating the previous batch, sufficient acetic acid and water being added separately as in the previous stage to form the stated amount of 60% acid.

The mixture is then treated as described above and the process repeated as often as may be necessary to obtain a product having a satisfactory clarity. The final extraction is with fresh 60% acid. Usually 3 or 4 extractions are sufficient to effect a substantial improvement in clarity. In order to obtain the best results, however, it has been found preferable to employ the method previously described in which a fresh extraction liquid is employed for each stage.

The invention has been particularly described in connection with the treatment of ethyl cellulose, since this is one of the most important of cellulose ethers. It will be appreciated, however, that it is applicable to the treatment of cellulose ethers in general, e. g. methyl, butyl and benzyl celluloses, using suitable solvent and non-solvent liquids. In addition to fatty acids other organic liquids, e. g. alcohols, toluene, dioxane, and acetone, and paraffin hydrocarbons such as petrol ether or ligroin can be used as solvents or non-solvents, according to the nature of the ether under treatment. The liquids employed may contain an agent capable of exerting a bleaching action, e. g. a concentration of 0.2% or 0.5% of chlorine.

Having described our invention, what we desire to secure by Letters Patent is:

1. Process for improving the clarity of a cellulose ether which is soluble in lower fatty acids, which comprises dissolving the cellulose ether in a lower fatty acid, and precipitating part only of the cellulose ether by diluting the solution with water.

2. Process for improving the clarity of ethyl cellulose which is soluble in acetic acid, which comprises dissolving the ethyl cellulose in acetic acid, and precipitating part only of the ethyl cellulose by diluting the solution with water.

3. Process for improving the clarity of ethyl cellulose which is soluble in mixtures of toluene and ethyl alcohol, which comprises dissolving the ethyl cellulose in acetic acid, and precipitating part only of the ethyl cellulose by diluting the solution with water.

4. Process for improving the clarity of ethyl cellulose which is soluble in mixtures of toluene and ethyl alcohol, which comprises dissolving the ethyl cellulose in acetic acid, and adding to the solution water in amount such that an aqueous acetic acid of concentration between 45 and 65% by volume is produced, whereby part only of the ethyl cellulose is precipitated.

5. Process for improving the clarity of ethyl cellulose which is soluble in acetic acid, which comprises dissolving the ethyl cellulose in acetic acid, precipitating part only of the ethyl cellulose by diluting the solution with water, and extracting the precipitate with an aqueous solution of acetic acid.

6. Process for improving the clarity of ethyl cellulose which is soluble in mixtures of toluene and ethyl alcohol, which comprises dissolving the ethyl cellulose in acetic acid, adding to the solution water in amount such that an aqueous acetic acid of concentration between 45 and 65% by volume is produced whereby part of the ethyl cellulose is precipitated, and extracting the precipitate with aqueous acetic acid of concentration between 45 and 65% by volume.

7. Process for improving the properties of ethyl cellulose which is soluble in mixtures of toluene and ethyl alcohol and which has an ethoxy content between 40 and 50%, which comprises dissolving the ethyl cellulose in acetic acid, adding to the solution water in amount such that an aqueous acetic acid of concentration between 45 and 65% by volume is produced whereby part of the ethyl cellulose is precipitated, and extracting the precipitate with aqueous acetic acid of concentration between 50 and 60% by volume.

JOHN HENRY SHARPHOUSE.
PHILIP RICHARD HAWTIN.
JOHN DOWNING.
WALTER HENRY GROOMBRIDGE.